UNITED STATES PATENT OFFICE.

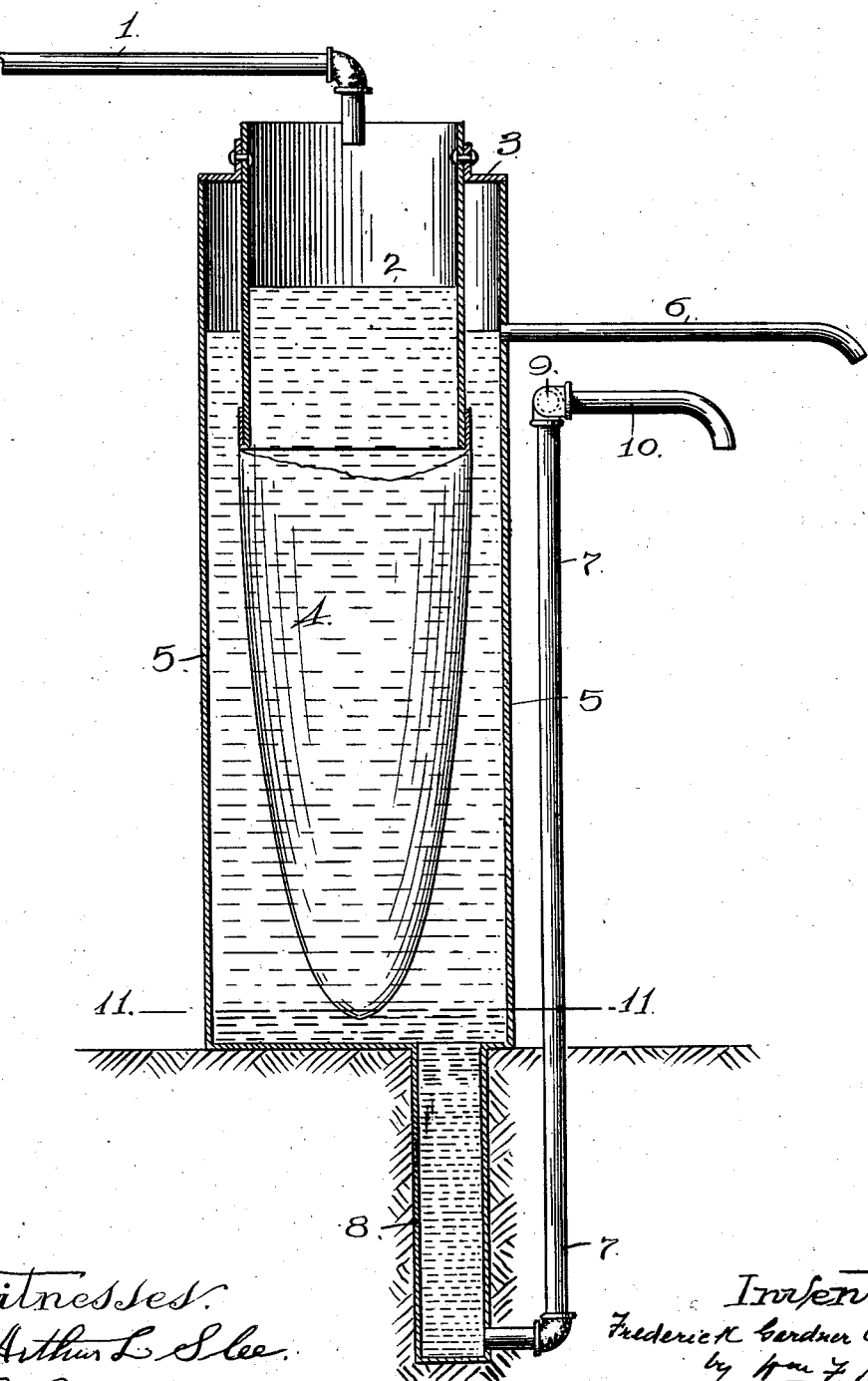

FREDERICK GARDNER COTTRELL, OF BERKELEY, CALIFORNIA, ASSIGNOR, BY MESNE ASSIGNMENTS, TO PETROLEUM RECTIFYING COMPANY, OF SAN FRANCISCO, CALIFORNIA, A CORPORATION OF CALIFORNIA.

PROCESS FOR SEPARATING AND COLLECTING PARTICLES OF ONE LIQUID SUSPENDED IN ANOTHER LIQUID.

994,377.  Specification of Letters Patent.  Patented June 6, 1911.

Original application filed October 12, 1909, Serial No. 522,343. Divided and this application filed November 7, 1910. Serial No. 591,172.

*To all whom it may concern:*

Be it known that I, FREDERICK GARDNER COTTRELL, a citizen of the United States, residing at Berkeley, in the county of Alameda and State of California, have invented certain new and useful Improvements in Processes for Separating and Collecting Particles of One Liquid Suspended in Another Liquid, of which the following is a specification.

This application is a division of that certain application filed by me on the 12th day of October, 1909, Serial Number 522,343, which application is still pending.

My invention relates to the art of separating mechanical mixtures of liquids, such, for example, as oil and water; and it consists in certain improvements, hereinafter fully described, in the methods and processes of such separation.

Many forms of filtering devices for the separation of small quantities of one liquid suspended in another liquid, as, for example, lubricating oil in condensed water from steam engines, have been devised; but in these one trouble invariably to be contended with is the tendency of the filter, if fine enough to retain the smaller particles, to become clogged by the emulsion formed in its meshes. In all such filter processes thus far proposed, the filtration has been commenced with the filter, say, for example, a sheet of cloth, essentially free from the liquid forming the suspended or internal phase of the mixture, with the result that it immediately becomes wetted, at least predominantly, with the other liquid which is there in greater mass. The filter once thoroughly saturated with this liquid, the other will, necessarily, have to collect in globules or irregular droplets, without wetting the fabric, and in this condition tends to either obstruct the pores of the filter or be carried onward through them.

The fundamental operating conditions of my present improvement is the thorough initial wetting of the filter septum with a liquid which is readily miscible with the liquid forming the internal phase of the mixture to be treated, in practice, the same liquid as composes said internal phase, thus establishing a continuous channel for the draining off of this internal phase liquid through this wetted septum, in a direction usually lateral to the general flow of the mixture to be separated. This procedure suffices to rapidly remove all the suspended liquid which is in the form of drops as large or larger than the pores of the filter.

In order to make the practice of my improvements clear, the following description of a concrete case of its application to the separation and collection of suspended water particles from crude petroleum is given, reference being had to the accompanying drawings in which the figure is a vertical sectional view of an apparatus in which my improvements may be carried out.

The oil, carrying the suspended water enters through the pipe 1, and is delivered into the sheet iron cylinder 2, from which it flows downward into a bag of cotton cloth 4. This cloth, before the contact of the oil therewith is to be thoroughly wetted with water. The iron cylinder 2, is supported by a flange 3 upon the shell 5 which incloses the cotton bag 4. The oil filters through the cloth bag 4 into the shell 5, and as the mixture of liquids passes through the cloth, the fine particles of water are caused to coalesce with each other and with the water wetting the cloth, and flow down through the cloth as a channel to the bottom of the bag and sink to the bottom of the shell 5 in large masses which readily coalesce of themselves, thus causing a sharp separation in the bottom of the apparatus of the two liquids into distinct layers, from which they may be separately withdrawn, the oil being taken off by the pipe 6 leading from the upper portion of the shell 5, and the water being taken off by the pipe 7 which leads from the bottom of a trap compartment 8 in the base of the shell 5, and thence rises to a swing joint at 9, by which its discharge end 10 is connected. It will thus be seen that the discharge level of the oil is fixed, but that of the water is adjustable by means of the swing joint at 9, thus providing for the control of the level of the line of separation of the two liquids, shown at 11, in the shell 5. It will now be readily apparent that the quantity of each of the separated liquids remains essentially constant without regard to the amount of either or both delivered to be treated, and that their separate outflow is automatically regulated.

Having thus described my invention, what I claim as new and desire to secure by Letters Patent is—

1. The improvement in the art of separating and collecting particles of one liquid suspended in another liquid which consists in passing said mixture through a pervious septum initially wetted with a liquid readily miscible with the liquid forming the internal phase of the mixture, in such wise as to cause any excess of the internal phase liquid to drain along said septum to its edge and collect in large masses essentially free from the liquid forming the external phase of said mixture.

2. The improvement in the art of separating and collecting particles of one liquid suspended in another liquid which consists in passing said mixture through a pervious septum initially wetted with a liquid readily miscible with the liquid forming the suspended drops of the mixture, in such wise as to cause these suspended drops to come in contact with said wetted septum and coalesce with the liquid therein and drain off therewith along and to the lower extremity of the septum; and collecting said drained liquid there-beneath in masses essentially free from the other constituent of the original mixture.

3. The improvement in the art of separating and collecting particles of one liquid suspended in another liquid which consists in passing said mixture through a pervious septum initially wetted with a liquid readily miscible with the liquid forming the suspended drops of the mixture, in such wise as to cause these suspended drops to come in contact with said wetted septum and coalesce with the liquid therein and drain off therewith along and to the lower extremity of the septum and collect in a layer distinct from the other liquid, the two liquids thus separated being then caused to rise separately in distinct columns and to freely overflow at such relative heights as to automatically regulate the discharge of each liquid in such wise as to maintain their surface of contact at a substantially constant level without regard to the amounts of either liquid introduced.

In testimony whereof I have signed my name to this specification in the presence of two subscribing witnesses.

FREDERICK GARDNER COTTRELL.

Witnesses:
 WM. F. BOOTH,
 D. B. RICHARDS.